April 18, 1933.  W. R. GRISWOLD  1,903,919
INTERNAL COMBUSTION ENGINE
Filed March 24, 1928
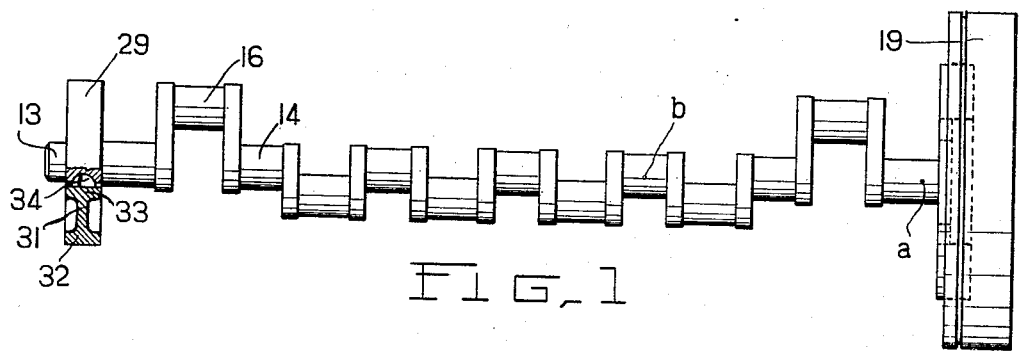
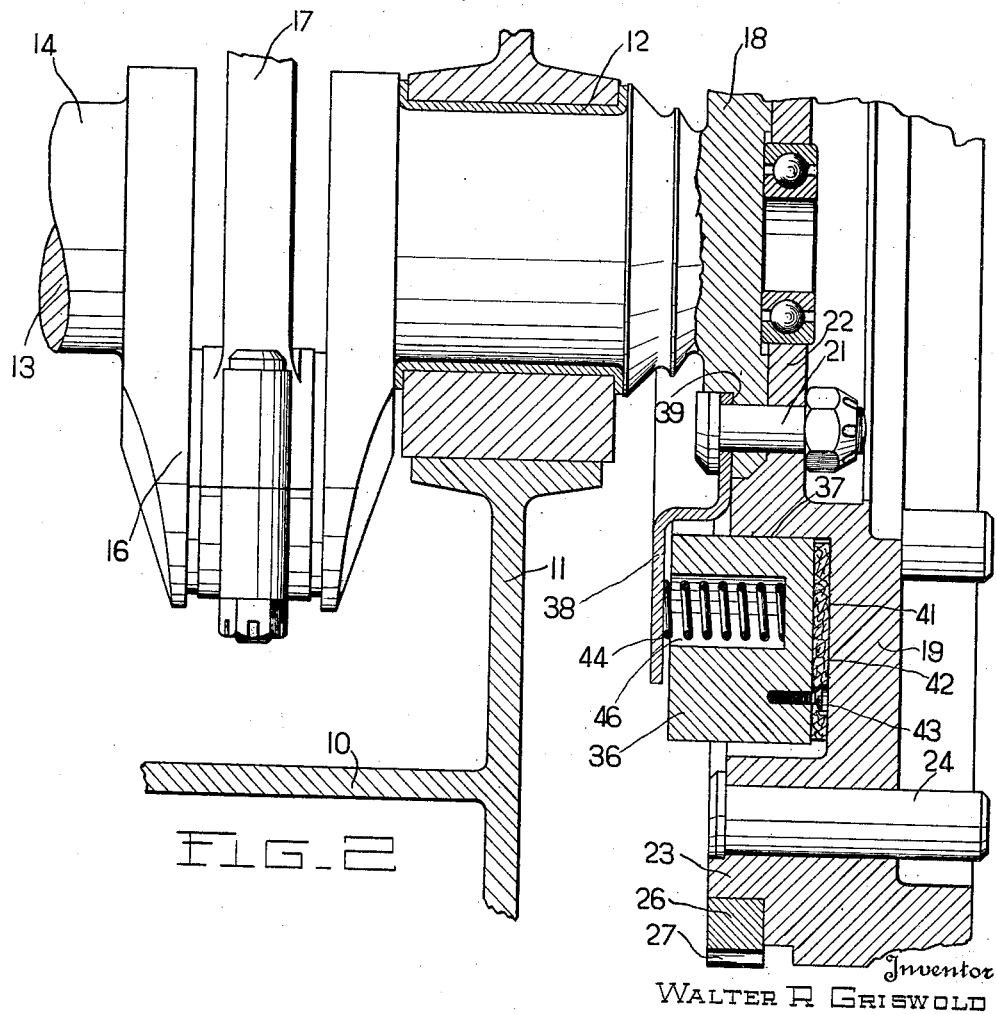
Inventor
WALTER R. GRISWOLD
By *Milton Tibbetts*
Attorney Patented Apr. 18, 1933

1,903,919

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed March 24, 1928. Serial No. 264,309.

This invention relates to internal combustion engines and more particularly to the control of torsional vibration in the crank shafts of such engines.

It has for one of its objects to provide means for frictionally damping such torsional vibration, in which the friction means may be mounted at either end of the shaft.

Another object of the invention is to provide a crank shaft having its inertia mass so distributed that the node of the vibration will occur at a point intermediate the ends of the shaft, combined with suitable damping means for either loop of said vibration.

Another object of the invention is to provide an engine crank shaft having damping means which may be mounted at the rear end of the shaft adjacent the main engine flywheel, and which shall cooperate therewith.

Another object of the invention is to provide a combined flywheel and vibration damper for engine crank shafts.

A further object of the invention is to provide means for securing such a combined flywheel and damper to an engine crank shaft.

Other objects of the invention will appear from the following description taken in connection with the drawing, which forms a part of this specification, and in which:

Fig. 1 is a view in side elevation, partially in section, of an engine crank shaft constructed and arranged in accordance with this invention, and Fig. 2 is an enlarged longitudinal sectional view through the rear end of the crank shaft shown in Fig. 1.

In engines of conventional construction, having a flywheel at the rear end of the crank shaft, it has heretofore been customary to mount the damping means at or adjacent the other or front end of the shaft. Such mounting frequently increases the overall length of the engine somewhat, and in certain cases interferes with the most desirable arrangement of the drive for the cam shaft and other engine accessories.

The present invention contemplates an arrangement whereby the damper may be mounted at the rear end of the shaft if desired, and combined with the usual engine flywheel. It has been been illustrated in connection with a conventional shaft of the well known six-throw type, but it is to be understood that the invention is not limited in its application to shafts of this nature.

Referring to the drawing, at 10 is shown a part of the crank case of an internal combustion engine, provided with transverse webs such as 11, which are adapted to support bearings 12 in which an engine crank shaft 13 is rotatably mounted. The shaft 13 includes bearing portions such as 14 and cranks 16 of the well known type, which are connected as by connecting rods 17 to pistons mounted in the engine cylinders. The pistons and cylinders are not illustrated, but this construction is well known in this art.

The rear end of the crank shaft 13 is provided with an integral flange 18 on which an engine flywheel 19 is secured in any convenient manner as by the bolts 21. The flywheel 19 consists of a web portion 22, which is secured to the flange 18, and a rim portion 23 of considerable mass, which is the inertia element of the flywheel. This flywheel 19 is provided with a circular row of driving pins 24 which are adapted to cooperate with and drive a friction clutch (not shown) of the usual form, through which the engine is connected to its load. The flywheel rim 23 is also provided with a ring gear 26 having teeth 27 which may be engaged by the pinion of any suitable starting mechanism for rotating the crank shaft to start the engine.

As so far described the crank shaft 13 is of the conventional form in common use in the propulsion of motor vehicles, and by reason of the concentrated mass of the flywheel 19 at the rear end of the shaft, it has an elastic curve of which the node is located close to this rear end, usually in the rear main bearing 14 at a point such as $a$ in Fig. 1.

In accordance with the present invention a second flywheel 29 is mounted at or adjacent the forward end of the crank shaft 13. This flywheel includes a web portion 31 and a rim portion 32, integral with a hub 33, which is rigidly secured to the crank shaft 13 in any convenient manner as by the key 34.

In the embodiment of the invention illustrated the flywheel 29 is illustrated as of considerably less mass than the flywheel 19, but it is to be understood that the invention is not limited in this respect, but that the flywheels may be of equal size, or the flywheel 29 may be larger if desired. The effect of attaching the flywheel 29 to the shaft is to redistribute the inertia mass thereof, so that the elastic curve of the shaft is somewhat changed. In this way the node of this curve is moved forward from the rear end of the shaft to some intermediate point b thereon, the position of this point being determined by the ratio of the inertias of the flywheels 19 and 29. Thus if the flywheel 19 is so constructed as to have three times the inertia of the flywheel 29, the nodal point b will be located at a position approximately one-third of the length of the shaft from the larger flywheel 19.

Such shifting of the node to a position intermediate the ends of the shaft permits the vibration to be damped from either end. In the present embodiment of the invention this has been illustrated by the application of a damper to the large flywheel at the rear end of the shaft 13, but it is to be understood that such a damper could be applied to the shaft at or adjacent the forward flywheel 29 if desired. As shown, this damping means comprises an annular inertia member 36, rotatably mounted on or adjacent the flywheel 19, preferably on a bearing surface 37 thereof. The member 36 is retained in position axially of the flywheel 19 in any convenient manner, as by an annular retaining washer 38, having an inner portion adapted to be clamped by the heads of the flywheel bolts 21 to a seat 39 on the forward face of the crank shaft flange 18. The washer 38 has an outer surface projecting over and adapted to secure the inertia member 36 in position. The flywheel 19 is also provided with an annular friction face 41, adapted to cooperate with suitable friction lining 42 which is secured to the inertia member 36 in any suitable manner, as by the screws 43.

Means is provided to urge the inertia member axially toward the friction surface 41, and as shown this means comprises a number of compression springs 44 arranged in suitable recesses 46 in the inertia member 36, and bearing at their outer ends against the retaining washer 38.

From the above description it will be readily understood that the springs 46 exert pressure on the inertia member, urging it axially toward the flywheel, and tending to compress the friction lining 42 against the surface 41. Considerable friction is thus developed, which tends to resist rotation of the inertia member with respect to the flywheel, and which constitutes the principal damping friction of the device.

Upon the inception of a torsional vibration in the shaft, those ends thereof removed from the nodal point b, are subjected to a rapid oscillatory vibration of small amplitude and high frequency, which vibratory motion is superposed on the steady rotative movement of the shaft, as is well known. This movement is shared by the flywheel 19 because of its rigid attachment to the crank shaft 13, but the member 36, because of its large inertia is unable to follow this vibratory movement, so that relative motion between the flywheel 19 and the inertia member 36 results. The friction produced at the surface 41 by reason of this motion converts into heat and dissipates from the system an amount of vibratory energy sufficient to prevent the resonant growth of such energy, thus effectively damping the disturbance.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination with an internal combustion engine having a crank shaft, of flywheels of different mass fixed to the shaft at the ends thereof, and a damping device adjacent the flywheel of greater mass including inertia means frictionally connected to the shaft.

2. The combination with an internal combustion engine having a crank shaft, of a flywheel fixed to each end of the shaft, said flywheels being of different sizes, and an inertia member frictionally connected to the shaft adjacent the larger flywheel to damp torsional vibration in said shaft.

3. The combination with an internal combustion engine having a crank shaft, of a flywheel fixed to one end of the shaft, a larger flywheel fixed to the other end of the shaft, an inertia member movably mounted on said shaft, and friction means connecting the inertia member to said larger flywheel.

4. The combination with an internal combustion engine having a crank shaft, of a flywheel fixed to one end of the shaft, a flywheel having a web portion fixed to the other end of the shaft and a rim portion of greater inertia than the first named flywheel, an inertia member movably mounted with respect to said web portion, and a friction connection between the inertia member and said web.

5. The combination with an internal combustion engine having a crank shaft, of spaced flywheels of different mass fixed to said shaft, and damping means adjacent the flywheel of greater mass including an inertia member and means frictionally connecting said inertia member to said flywheel.

6. The combination with an internal combustion engine having a crankshaft, of flywheels of different mass fixed to the shaft at the ends thereof, and a damping device adjacent the flywheel of greater mass including inertia means and energy absorbing means connecting said inertia means to the shaft.

In testimony whereof I affix my signature.

WALTER R. GRISWOLD.